Feb. 9, 1971

H. R. ZEIDLER 3,561,125

THREE-DIMENSIONAL POSITION INDICATING SENSOR

Filed Feb. 23, 1968

INVENTOR.
HERMAN R. ZEIDLER,

BY
Berman, Davidson & Berman
ATTORNEYS.

INVENTOR.
HERMAN R. ZEIDLER,

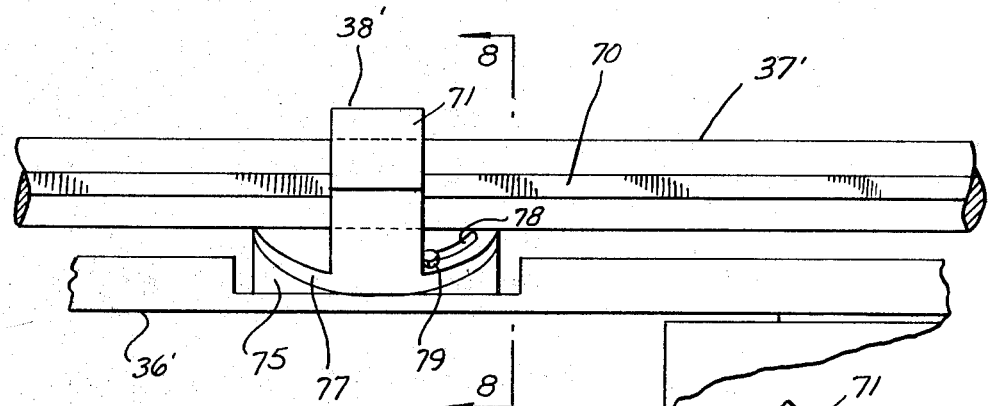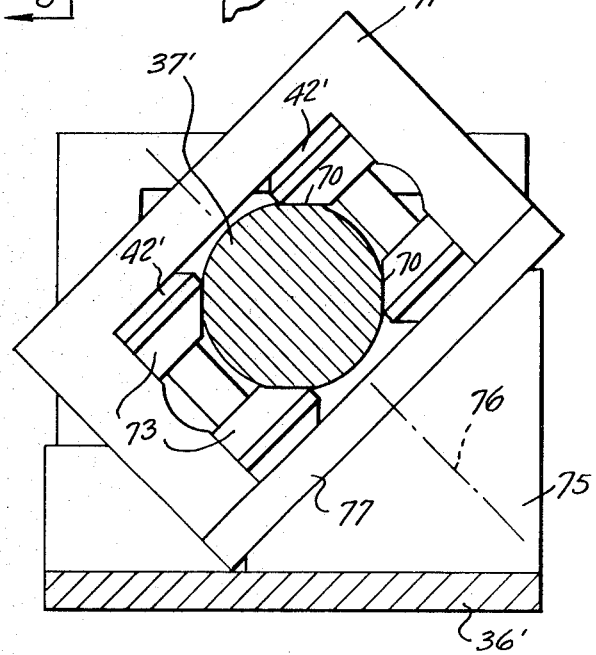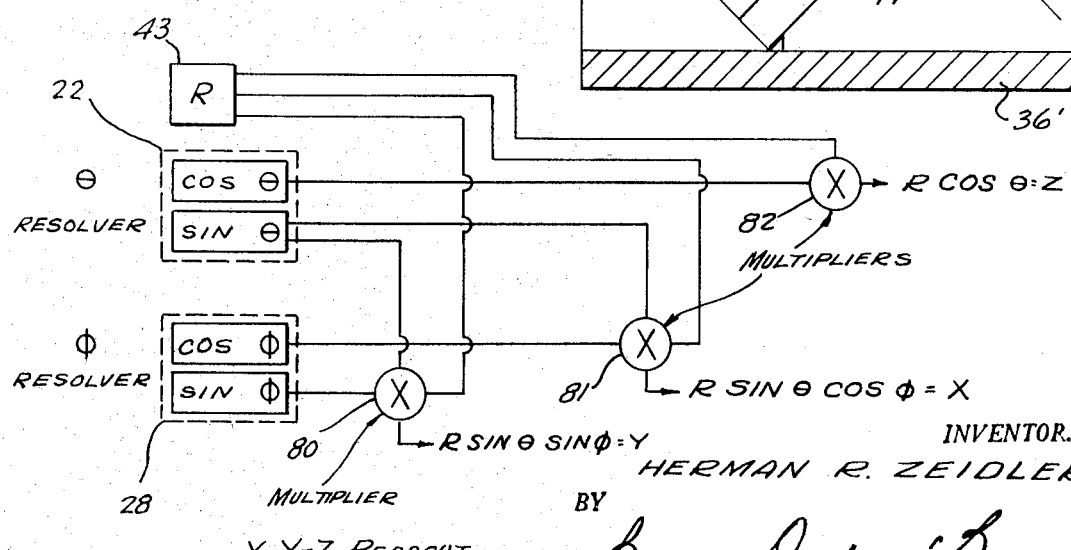

United States Patent Office 3,561,125
Patented Feb. 9, 1971

3,561,125
THREE-DIMENSIONAL POSITION INDICATING SENSOR
Herman R, Zeidler, Farmingdale, N.Y., assignor to Linear Motion Technology, Inc., Farmingdale, N.Y., a corporation of New York
Filed Feb. 23, 1968, Ser. No. 707,576
Int. Cl. G01b 7/00
U.S. Cl. 33—174          13 Claims

ABSTRACT OF THE DISCLOSURE

A three-dimensional calipering device for sensing the location of a point by spherical coordinates, wherein a typical example of the device consists of a horizontal supporting table on which a gimbal bracket is swivelled for rotation on a horizontal axis. The bracket carries a gimbal member swivelled thereon for rotation on an axis normal to the first-named axis. A range arm is slidably-mounted in the gimbal member and carries a contact sensor at its end. The range arm is coupled to an electrical resolver giving an electrical "range" read-out corresponding to the amount of extension of the range arm in the gimbal member. The gimbal bracket and gimbal member are respectively coupled to electrical resolvers giving read-outs corresponding to the angular rotations of the gimbal bracket and gimbal member around their respective axes of rotation. The resolvers are connected in a computing circuit wherein an applied signal voltage controlled by the range resolver is inserted and the angle resolvers produce respective signal voltage drops which are also inserted in the circuit.

---

This invention relates to position-sensing devices, and more particularly to an electro-mechanical sensor system for measuring and describing the position of a point in space by spherical coordinates.

A main object of the invention is to provide a novel and improved sensor system for measuring and describing the position of a point in space in an accurately reproducible manner by employing spherical coordinates to define the position of the point, the system involving relatively simple components, being easy to operate, and being constructed and arranged to have inherent cross-axis dependence for its axis position indicators to limit and minimize position error.

A further object of the invention is to provide a combination electrical and mechanical sensing system for measuring and describing the position of a point in space by spherical coordinates to describe point locations heretofore not able to be located except by the use of Cartesian coordinates, the apparatus employed involving a relatively small number of parts, being easy to fabricate, and being readily adaptable for use in a wide variety of applications, either as a two-dimensional or a three-dimensional measuring device, and either as a passive device to measure the location of points for inspection purposes, or as an active part of a machine, for example, a milling or drilling machine to indicate immediate position, or to utilize such indications to generate feed-back signals to control the operation of the machine.

A still further object of the invention is to provide an improved electro-mechanical position sensor utilizing spherical coordinates to define positions in space, the system minimizing errors heretofore present due to the inaccuracy of ways, such as those employed in the previously used Cartesian coordinate systems, the system of the present invention employing parts whcih are lighter in weight and more accurate than those of existing or previously used systems, and the elements of the system of the present invention having cross-dependence, thereby ensuring accuracy of position location independently of way accuracy, whereby the device of the present invention may be manufactured at relatively small expense because highly precise machining is not absolutely essential.

Further objects and advantages of the invention will become apparent from the following description and claims, and from the accompanying drawings, in which:

FIG. 7 is an enlarged fragmentary elevational view showing a portion of the range bar and range bar-supporting plate in a modified form of the present invention.

FIG. 8 is an enlarged transverse vertical cross-sectional view taken substantially on the line 8—8 of FIG. 7.

FIG. 9 is a block diagram representing a computing circuit which may be employed with the apparatus of the present invention to form a position-indicating systed in a three-dimensional environment.

Figure 1:
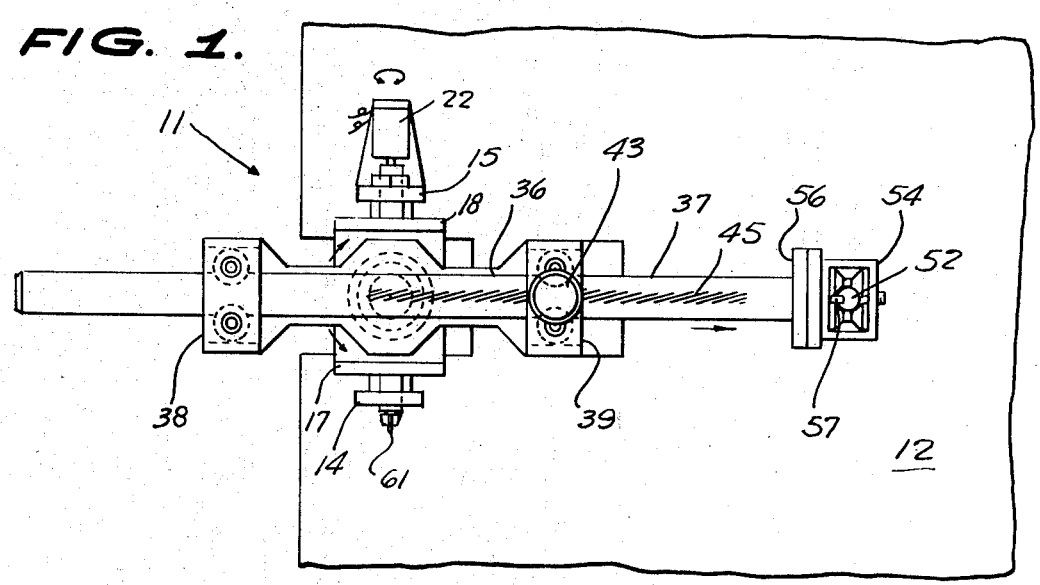
FIG. 1 is a fragmentary top plan view of an object-supporting table provided with an electro-mechanical position-sensing appaartus constructed in accordance with the present invention.

A prime purpose of the present invention is to provide a system employing conventional or commercially available electrical hardware, together with relatively simple and easily built mechanical parts for measuring and describing the position of a point in space by spherical coordinates and for avoiding the serious difficulties heretofore encountered in devising a system employing Cartesian coordinates, for example, employing "XY tables" in combination with devices for measuring the Z coordinate, whereby to define a point by its XYZ coordinates. The main difficulties with such Cartesian coordinate measuring devices such as XY tables and similar devices based on the Cartesian system is the independence of the various coordinate position indicators with respect to each other. For example, assume the X axis position indicator is locked with the X axis driver (such as a lead screw, or the like), and the carriage of the device is to move along a straight line parallel to the Y axis. Mathematically, this is described as $Y=K$, $X=$ a constant. K represents the Y coordinate value at any particular point. Due to the practical incapability of creating perfectly straight ways, it is impossible for the carriage to follow the required path without having some slight deviation of its X coordinate value. However, this deviation is not measurable because the X axis position indicator is locked at its normal value. Because of this independence limitation, great care and expense are involved in the effort required to limit and minimize such unintended position errors. The intent of the present invention is to provide position sensing with inherent cross-axis dependence of its axis position indicators. Thus, in the prior systems employing Cartesian coordinates, an undetectable error in the work along Y, for example, may be introduced in the measurement along X, etc., since the three coordinate measurements are independent. In the system of the present invention, measurements of double-angle functions and range are utilized to obtain the position coordinates, the measurements being cross-coupled so that any deviation of one measurement will produce a substantially compensating effect on the other measurements, all the systems being energized simultaneously and being simultaneously active, so that the read-out results are simultaneously obtained with no opportunity for errors which may be present in systems employing a sequence of read-outs, as in the Cartesian coordinate systems employed in the past.

Referring to the drawings, 11 generally designates a typical example of a three-dimensional electro-mechanical position-locating apparatus constructed according to the present invention. The apparatus 11 comprises a horizontal table 12, employed as a reference surface on which to support an object on which a point is to be located and for which reproducible locating data is to be obtained. The table 12 is formed with a notch 13, and rigidly-secured to the table at opposite sides of said notch are the respective upstanding vertical gimbal-supporting arms 14 and 15. Designated generally at 16 is a gimbal bracket having respective side arms 17 and 18 which are pivoted to the top portions of the upstanding arms 14 and 15 on a common horizontal axis, having the respective pivot shafts 19 and 20. The upstanding arm 14 is provided with a horizontal wing screw 61 threadedly-engaged therethrough, lockingly-engageable in a recess 62 provided in the side arm 17 for, at times, locking the gimbal bracket 16 in a fixed position with its axis vertical, for a purpose presently to be described.

Figure 3:
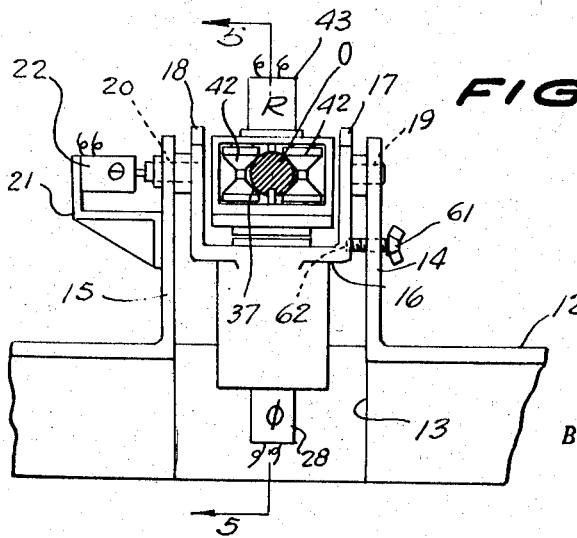
FIG. 3 is a transverse vertical cross-sectional view taken substantially on the line 3—3 of FIG. 2.
Figure 6:
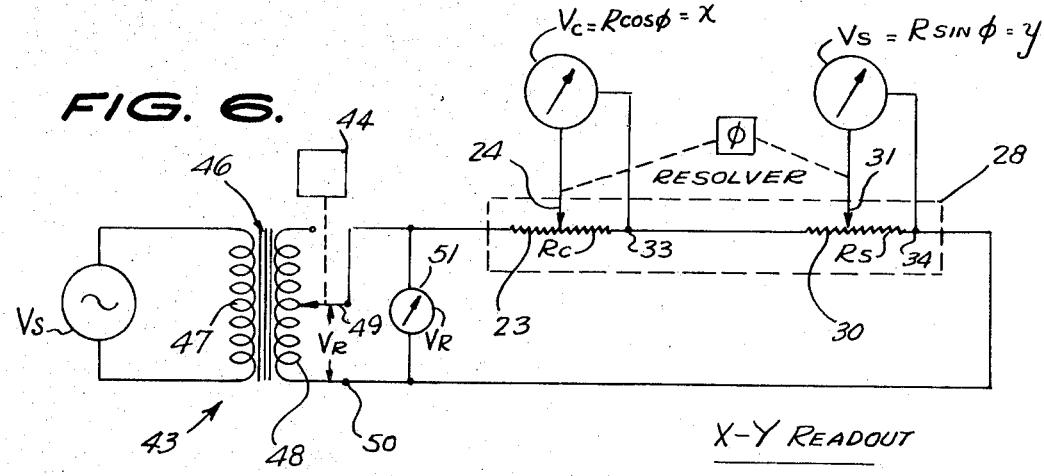
FIG. 6 is a wiring diagram showing a typical electrical computing circuit which may be employed in conjunction with the apparatus of FIGS. 1 to 5 to form a position-indicating system according to the present invention, in a two-dimensional environment.

Secured to the upstanding arm 15 is a bracket member 21 in which is mounted a conventional resolver unit whose operating shaft is rigidly-connected coaxially to a shaft element 20 associated with the gimbal bracket 16, whereby the resolver unit 22 is arranged to develop a measurable electrical effect, such as a change in resistance, impedance, phase angle, or the like, in accordance with the angular rotation of the gimbal bracket 16 around the horizontal axis defined by the shaft elements 20 and 19. As will be subsequently pointed out, the resolver may be of a conventional type providing electrical effects corresponding to the sine and cosine functions of the associated angle of rotation. For purposes of discussion, the angle representing rotation around the horizontal axis defined by shaft elements 20 and 19 is designated by the Greek letter $\theta$, and accordingly, this symbol is applied to the resolver 22 in FIG. 3. The resolver 22 is of conventional construction, and may have any suitable form, the most simple form probably being that employing potentiometers with tandem-coupled sliding contacts, similar to that illustrated schematically in FIG. 6, presently to be explained in more detail.

Figure 5:
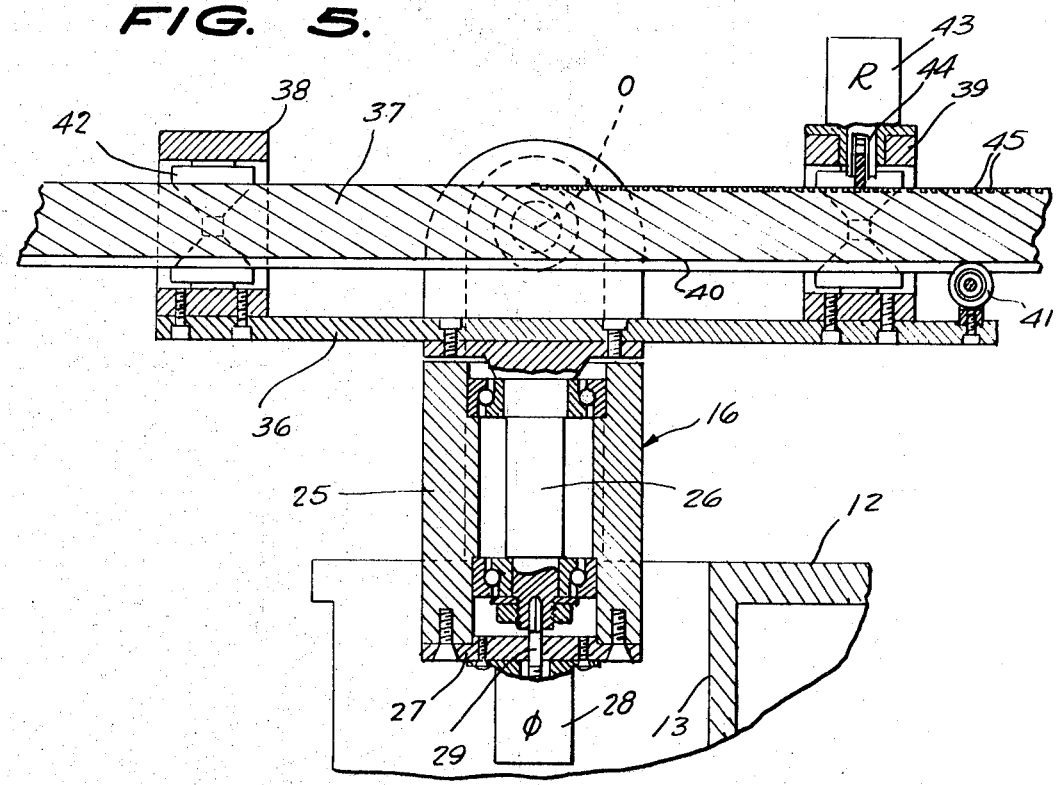
FIG. 5 is an enlarged fragmentary transverse vertical cross-sectional view taken substantially on the line 5—5 of FIG. 3.

The gimbal bracket 16 is provided with the depending generally cylindrical main body portion 25 in which is axially-journaled a gimbal shaft 26 which is perpendicular to the horizontal shaft defined by the elements 20, 19, and whose axis intersects the axis of said horizontal shaft at a center point designated at O in FIG. 5. Said axis of the gimbal shaft 26 is locked in a vertical position when the clamping screw 61 is tightly-engaged in the recess 62, as above-mentioned.

Rigidly-secured to the bottom end of the body member 25 is a cover disc 27 on which is mounted a conventional resolver 28, similar to the resolver 22, and arranged to provide electrical changes corresponding to the functions of the angle of rotation of gimble shaft 26 around its axis, said angle being designated by the Greek letter $\phi$ in FIG. 5. Thus, the resolver 28 may comprise potentiometers having the respective windings 23 and 30 mounted rigidly with respect to the cover disc 27 and engaged by respective movable contacts 24 and 31 mechanically-coupled to the operating shaft member 29 of the resolver, the sliding contact 24 being arranged to provide a read-out in accordance with the cosine of the angle $\phi$, and the sliding contact 31 being arranged to provide a read-out in accordance with the sine of the angle $\phi$, as will be presently explained.

Suitable data read-out devices may be employed with the potentiometers of the respective resolvers, for example, each resolver may be provided with respective meters $V_c$ and $V_s$ connected across the movable contacts and end terminals of the associated potentiometers of the resolvers. For example, as shown in FIG. 6, a cosine read-out meter $V_c$ is connected across the movable contact 24 and the end terminal 33 associated with potentiometer winding 23 and a sine read-out meter $V_s$ is connected across the movable contact 31 and the end terminal 34 of the potentiometer winding 30.

The resolver 22 may be provided with read-out devices similar to those associated with the resolver 28, as is illustrated schematically in FIG. 9.

Rigidly-secured to the top end of the gimbal shaft 26 and extending perpendicular to said shaft is a supporting plate 36 which, in a normal vertical position of gimbal shaft 26, namely, when screw 61 is lockingly-engaged in recess 62, extends horizontally, namely, parallel to the main supporting table 12. A range bar 37 is slidably-supported on plate 36 for parallel longitudinal movement relative thereto, for example, being slidably-supported in respective double-V roller bearing assemblies 38 and 39 provided on plate 36 and being spaced on opposite sides of the zero point O, as shown in FIG. 5. The range bar 37 may be of any suitable cross-section and may be suitably provided with means for preventing rotation thereof around its own axis, for example, may be of circular cross-section and may be provided with a longitudinal bottom keyway 40 receiving one or more roller elements 41 journaled on plate 36, as shown in FIG. 5. An alternative arrangement is illustrated in detail in FIGS. 7 and 8 wherein the range bar, designated at 37' is provided with four equally-spaced longitudinal flats 70, for example, a pair of diametrically-opposite side flats 70, 70 extending vertically, and a pair of diametrically-opposite top and bottom flats 70, 70 extending horizontally. The range bar is supported in a plurality of roller bearing assemblies designated generally at 38', each assembly comprising an inclined rectangular frame 71 rigidly-secured on the supporting plate, designated at 36'. Journaled in each frame 71 on opposite sides of the range bar 37' are respective pairs of V-roller elements 42', 42' having frustoconical inner roller surfaces 73 supportingly-engaging the longitudinal flats 70, as shown in FIG. 8. As will be seen from FIG. 8, the frusto-conical roller surfaces of each roller element 42' respectively engage one vertical and one horizontal flat of the range bar 37', so that the rollers respectively provide opposing rolling contact surfaces on the opposite sides of the range bar 37', as well as on the top and bottom thereof. The arrangement shown in FIGS. 7 and 8 thereby ensures maximum stability and smoothness of operation of the range bar in its supporting bearing units.

As shown in FIG. 7, the frames 71 may be swivelly-mounted on supporting blocks 75 in a manner to allow rotational adjustment of the frames 71 around axes, such as the axis 76 shown in FIG. 8, parallel to and located between the axes of the roller elements 42', 42', each axis 76 intersecting the longitudinal axis of the range bar 37' perpendicularly thereto. The frames 71 may be provided with circular base portions 77 having concentric arcuate slots 78 through which are engaged clamping screws 79 threaded into the associated blocks 75 for clamping the frames 71 in adjusted positions maintaining positive contacts of their frusto-conical roller surfaces 73 with the flats 70 of range bar 37'.

As will be apparent from FIG. 8, the axis 76 is at 45° to the horizontal, corresponding to the 45° inclination of the circular base plate 77 of the associated roller frame 71.

Any suitable number of supporting bearing assemblies 38 or 38' may be employed for the range bar 37 or 37', sufficient to maintain the range bar accurately parallel to the plate 36 or 36' at all times, namely, to maintain the range bar accurately perpendicular to the axis of the gimbal shaft element 26, with the zero point O located on the central axis of the range bar. Thus, in the typical embodiment illustrated in FIGS. 1 to 5, the assemblies 38 and 39 may be located symmetrically on opposite sides of the center point O, as shown in FIG. 5, with the auxiliary keying roller 41 located a substantial distance forwardly of the assembly 39, namely, in the direction of extension of the range bar, with the roller 41 closely-received in the groove 40, but being free to roll responsive to longitudinal movements of the range bar.

The double-V roller assemblies 38 and 39 may comprise suitable generally rectangular supporting frames in which are journaled opposing V-rollers 42, 42 having frusto-conical shaft-engaging surfaces which are engaged by the range bar 37 with close rolling contact to substantially prevent deviation of bar 37 from a path of movement wherein its axis contains the zero point O and wherein its axis is always maintained perpendicular to the axis of the gimbal shaft element 26. A transducer comprising a conventional resolver is mounted on the V-roller assembly 39 with its operating element 44 drivingly-coupled to the range bar 37. Thus, the operating element 44 may comprise a beveled gear which meshes with beveled gear teeth 45 provided on the top surface of range bar 37, so that the operating element 44 is rotated in accordance with the longitudinal movements of the range bar. The resolver may be of any suitable type providing a change in an electrical condition in accordance with the degree of rotation of the element 44. The resolver, designated by the additional symbol R in FIG. 5, may, for example, include a transformer 46 having a primary winding 47 and a secondary winding 48, said secondary winding being provided with a sliding tap 49. The sliding tap 49 may be mechanically-coupled to the beveled gear 44 so as to be driven thereby, namely, along the turns of the secondary winding 48 responsive to rotation of the beveled gear 44. If so desired, a suitable read-out meter, designated by $V_R$ in FIG. 6, may be connected across the movable contact element 49 and one end terminal 50 of secondary winding 48.

In the modification illustrated in FIGS. 7 and 8, a resolver may be suitably mounted on any one of the frames 71 and may be drivingly-coupled to the range bar 37' in the same manner as above-described in connection with the resolver shown in FIG. 5.

FIG. 6 illustrates a typical electrical circuit which may be employed with the apparatus when the screw 61 is tightened so as to clampingly-engage in the recess 62, whereby to lock the gimbal bracket 16 in a position wherein the axis of shaft 26 is vertical and the range bar 37 (or 37') is constrained to rotate in a horizontal plane. In the circuit of FIG. 6, a suitable alternating signal source $V_S$ is connected to the primary winding 47 of transformer 46. The $\phi$-angle resolver resistance winding 23 and the $\phi$-angle resolver resistance winding 30 are connected in a series circuit which is connected across the sliding contact 49 and the terminal 50 associated with secondary winding 48 of transformer 46. It will thus be seen that the signal voltage input to the computing circuit comprising the resistance windings 23 and 30 associated with the resolver 28, in FIG. 6, varies in accordance with the range distance, namely, the longitudinal movement of the range bar 37 (or 37'). This input signal voltage is designated by the symbol $V_R$ in FIG. 6, and may be read-out on the meter designated at 51 in FIG. 6. Therefore, the range distance has its electrical analog in the input voltage value $V_R$.

Figure 2:
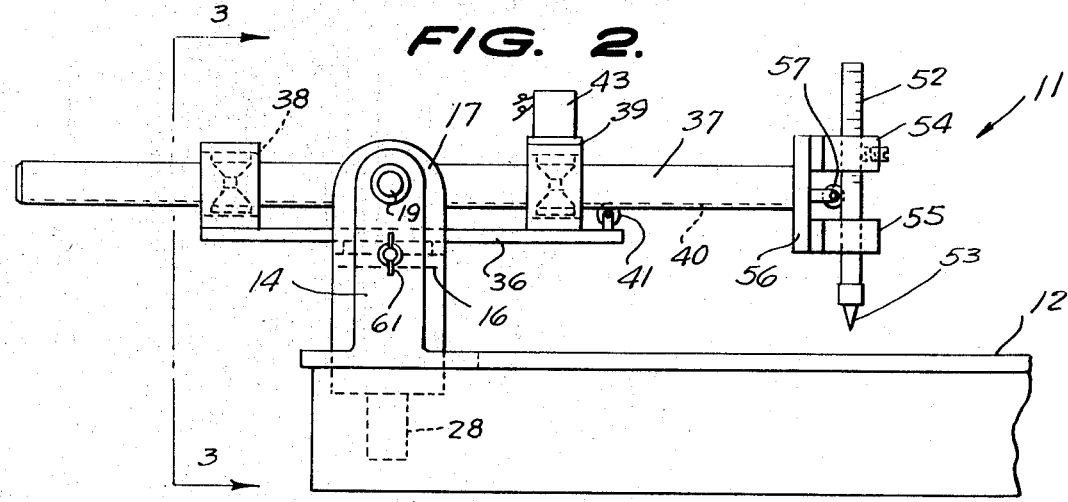
FIG. 2 is a side elevational view of the table and the apparatus of FIG. 1.

Then range bar 37 (or 37') is provided at its forward end with an adjustable feeler rod 52 having a pointed tip 53. Suitable bearing means, such as spaced bearing assemblies 54 and 55 may be provided on a support plate 56 rigidly-secured to and extending perpendicular to the forward end of range bar 37 (or 37'), the bearing units 54 and 55 being preferably similar to the units 38 and 39 (or 71), previously described. Feeler rod 52 may be provided with means to prevent rotation thereof around its own axis, for example, may be provided with a longitudinal groove in which is engaged a roller 57 journaled on the support plate 56 and being closely-received in the groove, as in the case of the roller 41 and its associated groove 40, the roller 57 being located substantially midway between the bearing assemblies 54 and 55, as shown in FIG. 2. Alternatively, the arrangement similar to that illustrated in FIGS. 7 and 8 may be provided.

The arrangement provides adjustment of the feeler rod 52 in a direction perpendicular to the axis of the range bar 37. Any suitable means may be employed to lock the feeler rod 52 in a specific adjusted position wherein it is thereafter rigid with the range bar 37. Suitable markings may be provided on the feeler rod 52 which can be employed in conjunction with the parts fixed to plates 56 to reproduce any desired or previously used setting of the feeler rod 52 in the bearing units 54 and 55.

As will be readily apparent, with the feeder rod 52 locked in a fixed position relative to the range bar 37, the longitudinal movements of the range bar 37 changes the position of the sliding contact member 49 and thus, varies the range signal voltage $V_R$. With the contact tip 53 engaging a particular point, and with the feeler rod 52 thus clamped, a particular range signal value $V_R$ will be read-out on the meter 51, corresponding to the range distance coordinate of the feeler tip 53.

As will be apparent from FIG. 6, the voltage drop across the resistance component $R_C$ between the movable contact element 24 and the terminal 33 will appear on the read-out meter $V_C$. This is the analog of the value of R cos $\phi$ mechanically computed by the series circuit. Similarly, the voltage drop across the resistance segment $R_S$ between the movable contact element 31 and the terminal 34 will correspond to the value of R sin $\phi$ and will be read-out on the meter $V_S$. As will be presently explained, it is possible to specify the position of any point on an object located on the table 12 in terms of coordinates which are respective functions of range ($V_R$), $\theta$ (in this case, at 90°), and $\phi$ (whose sine and cosine values are determined by the resolver 28), assuming the feeler tip 53 engages the point under consideration.

Figure 4:
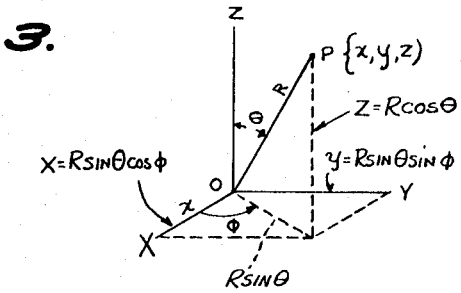
FIG. 4 is a diagram to illustrate how a point in space can be defined by spherical coordinates, namely, by range and angle coordinates.

FIG. 4 illustrates the well-known transformation of Cartesian coordinates in a three-dimensional system into polar coordinates. Thus, the X, Y and Z values of coordinates in the normal Cartesian coordinate system can be specified in terms of the R, $\theta$ and $\phi$ values of the polar coordinate system. It will be seen in FIG. 4 that $\theta$ is the angle between the range line R and OZ axis. The angle $\phi$ is that between the vertical plane containing the range line R and the OX axis. By simple trigonometric analysis, well-known to those skilled in the art of polar coordinate transformation, it can be shown that the Cartesian coordinates of the point P at the end of the range line R can be given by $X = R \sin \theta \cos \phi$, $Y = R \sin \theta \sin \phi$, and $Z = R \cos \theta$.

It will be noted that each of the Cartesian coordinate values is directly proportional to the value of R in the same manner that the current in the computing circuit of FIG. 6 is directly proportional to the range signal value $V_R$.

It will be further noted that the X and Y values in Cartesian coordinates are functions of all three of the spherical coordinate variables R, $\theta$ and $\phi$, and that the Z value is a function of both R and $\theta$. In the X–Y read-out system utilizing the circuit of FIG. 6, the angle $\theta$ is 90°, whereby the value of Z is zero. The value of sin $\theta$ is unity, whereby from the above equation, $X = R \cos \phi$ and $Y = R \sin \phi$. This coordinate read-out information is provided by the respective meters $V_C$ and $V_S$, as illustrated in FIG. 6. The observed read-outs can, therefore, be used to uniquely specify the position of any point in the X–Y plane in which the feeler tip 53 is located, namely, to uniquely specify the position of any point engaged by the feeler tip 53 with the feeler rod 52 clamped in a specified fixed position relative to range bar 37.

It will further be apparent that the Z coordinates may be read or specified directly by employing the scale markings provided on the feeler rod 52 to reproduce any desired or specified setting of the feeler rod 52 in the bearings units 54 and 55, as above-mentioned. However, the X, Y and Z coordinates can be determined electrically and simultaneously by the use of a computing circuit corresponding to that of FIG. 6, but arranged to compute the X, Y and Z values from the equations given above employing R and the functions of the angles $\theta$ and $\phi$. Such a coordinate computing circuit is illustrated diagrammatically in block form in FIG. 9. In this computing circuit the resolvers 22 and 28, which are similar to each other, and which may be similar to the resolver 28 of FIG. 6, are connected so as to feed their outputs to multipliers which also receive outputs from the range transducer 43. Thus, the range transducer 43, the sin $\theta$ component of resolver 22, and the sin $\phi$ component of the resolver 28 feed respective input signals to a first multiplier 80, conventional in nature, which provides an output corresponding to the Y coordinate value, namely, R sin $\theta$ sin $\phi$. The cos $\phi$ component of resolver 28, the sin $\theta$ component of resolver 22, and the range resolver 43 feed input signals to a second conventional multipler 81 which provides an output signal corresponding to the X coordinate value, namely, R sin $\theta$ cos $\phi$. The cos $\theta$ component of the resolver 22 and the range transducer 43 feed respective input signals to a third conventional multipler 82 which provides an output signal corresponding to the Z coordinate value, namely, R cos $\theta$. The multipliers 80, 81 and 82, as above-mentioned, are of conventional construction, and may be, for example, similar to, or combinations of Model No. 444081 Solid State Magnetic Multiplier/ Divider manufactured by Leeds & Northrup Company, 4907 Stenton Avenue, Philadelphia, Pa.

It will be understood that the arrangement illustrated by the system of FIG. 9 is that wherein the gimbal bracket 16 is free to swing relative to the upstanding arms 14 and 15, namely, with the screw 61 released.

From the above discussion, it will be apparent that the system according to the present invention provides direct determination of the necessary coordinates of a point on table 12 engaged by the tip 53, the locating coordinates being derived from the range distance and the sine and cosine values of the $\theta$ angle and the $\phi$ angle. Since the measurements are reduced to their simplest form, the apparatus involves a minimum number of parts and, therefore, is lighter in weight and potentially more accurate in its operation than the prior systems heretofore employed. The apparatus can be utilized either as a passive device to measure position for inspection purposes, or as an active part of a machine tool, such as a milling or drilling machine, by being attached thereto in a manner to indicate the position of the cutter element of the tool. The signals provided by the read-out portions of the system may be employed as feedback means to control the positioning of the cutter element of the machine.

Since the position coordinates are derived from a common computing circuit and are simultaneously observed, they have inherent cross-dependence upon each other, whereby accuracy of position location is obtained independently of way accuracy. This is in contrast to the requirements of position-locating devices based on the Cartesian system wherein lead screws and carriages intended to move along straight lines are required. In such devices, due to the practical incapability of creating perfectly straight ways, it is impossible for a carriage to follow its required path without having some deviation producing an error in the measurement of a companion coordinate. This deviation is usually not measurable because the coordinate measurements are made independently, namely, with all indicators locked except that associated with the coordinate to be measured. Because of this independence limitation in such devices, great care and expense must be applied to limit and minimize non-indicated position errors.

The above disadvantages are overcome by the apparatus described herein wherein there is cross-dependence of one coordinate upon the other. Due to this cross-dependence, the necessity for a high accuracy in the machining of the various parts of the apparatus is considerably reduced, as compared with corresponding requirements in the systems heretofore employed.

It should be understood that while the range bar 37 has been specifically illustrated herein as having a substantially circular cross-section, the range bar may have any desirable cross-sectional shape, for example, may be non-circular, such as square, or any other desirable geometrical shape. In such a design the bearing means on the range carrier 36 will be appropriately provided with rollers having shapes conformably receiving the range bar. The advantages of providing the range bar with a non-circular shape and conformably-receiving rollers, as above-mentioned, is that no additional special means need be provided for preventing rotation of the range bar. In other words, by employing a non-circular range bar 37, the necessity for providing a longitudinal keyway 40 and associated roller 41 is eliminated. Another alternative would be to form the range bar 37 with a dovetail cross-sectional shape and with a corresponding dovetailed guideway means on the range bar carrier 36, similar to the dovetailed guideways employed on lathes and other machine tools. Obviously, the range bar may be of any practical or economically desirable cross-sectional shape, as above-mentioned. The range bar may be square, or may be round with four equally-spaced longitudinal flats, as shown in FIGS. 7 and 8, with the rollers of the range bar provided with frusto-conical portions 73 engaging the range bar longitudinal flats so as to guide the range bar while, at the same time, to prevent rotation thereof around its own axis. As above-mentioned, with this modification the groove 40 and the roller 41 can be omitted.

It should be understood that the resolvers 22, 28 and transducer 43, above-described, are merely illustrated in highly-simplified form wherein the resolvers 22 and 28 include pairs of potentiometers having sliding taps providing voltage drops across the potentiometer windings which are the analogs of the sines and cosines of the respective angles $\theta$ and $\phi$, and wherein the transducer 43 includes a sliding tap on the secondary of a transformer, whereby the voltage $V_R$ is the analog of the range distance. Obviously, much more sophisticated types of resolvers may be employed, for example, resolvers of the induction type, such as Model No. CJO 0585100, and similar units manufactured by Kearfott Products Division, General Precision, Incorporated, Little Falls, N.J.

While a specific embodiment of an improved three-dimensional calipering device for sensing the location of a point by spherical coordinates has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A position-sensing and indicating device comprising a gimbal bracket, a gimbal member pivoted to said gimbal bracket for rotation on a reference axis, bearing means on said gimbal member defining a linear guideway, a range bar engaged in said guideway and constrained to move therealong, point-engaging means on the range bar, range-sensing means operated by said range bar, angle-sensing means operated by said gimbal member, sensing the angular movement of the gimbal member around said reference axis, said linear guideway intersecting said reference axis at right angles and defining a zero reference point, means simultaneously indicating the responses of said range-sensing means and said angle-sensing means, means pivotally-mounting said gimbal bracket for rotation on a second reference axis perpendicular both to said linear guideway and said first-named reference axis and extending through said zero reference point, second angle-sensing means operated by said gimbal bracket, sensing the angular movement of the gimbal bracket around said second reference axis, and means indicating the response of said second angle-sensing means simultaneously with the responses of the range-sensing means and the first-named angle-sensing means.

2. The position-sensing and indicating device of claim 1, and a work-supporting surface adjacent said range bar and perpendicular to said first named reference axis.

3. The position-sensing and indicating device of claim 1, and wherein said point-engaging means comprises a rod-like member extending perpendicular to the end of the range bar, bearing means on the end of the range bar supporting said rod-like member for lengthwise adjustment, and means to clamp said rod-like member in a selected position of lengthwise adjustment in said bearing means.

4. The position-sensing and indicating device of claim 1, and wherein said means simultaneously indicating the responses of said range-sensing means and said angle-sensing means comprises an electrical circuit including means to electrically combine said responses.

5. The position-sensing and indicating device of claim 3, and wherein said range-sensing means comprises an electrical transducer mounted on said gimbal member and being drivingly-coupled to said range bar.

6. The position-sensing and indicating device of claim 5, and wherein said first-named angle-sensing means comprises an angular electrical resolver mounted on said gimbal bracket and being drivingly-coupled to said gimbal member.

7. The position-sensing and indicating device of claim 1, and wherein said range-sensing means comprises an electrical range transducer mounted on said gimbal member and being drivingly-coupled to said range bar, and wherein said first-named angle-sensing means comprises an angular electrical resolver mounted on said gimbal bracket and being drivingly-coupled to said gimbal member.

8. The position-sensing and indicating device of claim 7, and wherein the means simultaneously indicating the responses of said range-sensing means and said angle-sensing means comprises circuit means interconnecting the transducer and resolver, and respective electrical indicators connected to the transducer and resolver.

9. The position-sensing and indicating device of claim 7, and wherein said angular electrical resolver has a sine-deriving portion and a cosine-deriving portion, and said indicating means includes means to respectively combine the outputs of said portions with the output of the range transducer, whereby to derive respective Y-coordinate and X-coordinate signals.

10. A position-sensing and indicating device comprising a gimbal bracket, a gimbal member pivoted to send gimbal bracket for rotation on a reference axis, bearing means on said gimbal member defining a linear guideway, a range bar engaged in said guideway and constrained to move therealong, point-engaging means on the range bar, range-sensing means operated by said range bar, angle-sensing means operated by said gimbal member, sensing the angular movement of the gimbal member around said reference axis, and means simultaneously indicating the responses of said range-sensing means and said angle-sensing means, wherein said range-sensing means comprises a electrical range transducer mounted on said gimbal member and drivingly coupled to said range bar, and wherein said angle-sensing means comprises an angular electrical resolver mounted on said gimbal bracket and being drivingly coupled to said gimbal member, wherein the means simultaneously indicating the responses of said range-sensing means on said angle-sensing means comprises circuit means interconnecting the transducer and resolver, whereby said responses are cross coupled so that any deviation of one measurement will produce a substantially compensating effect on the other measurement, and respective electrical indicators connected to the transducer and resolver, said circuit means comprising a series circuit and a source of current connected to said circuit through said range transducer, said range transducer including means to regulate the voltage applied to said series circuit from the source in accordance with the amount of linear movement of the range bar along said guideway, said angular resolver having respective sine and cosine impedances included in said series circuit, and means to derive voltage drops across said impedances in accordance with the sine and the cosine values of the angle of rotation of the gimbal member, the means simultaneously indicating the responses of the range-sensing means and said angle-sensing means comprising respective meters connected to the impedances so as to respond to said voltage drops.

11. The position-sensing and indicating device of claim 1, and wherein said range-sensing means comprises an electrical range transducer mounted on said gimbal member and being drivingly-coupled to said range bar, and wherein said first-named and second angle-sensing means comprise respectively a first electrical angular resolver mounted on said gimbal bracket and being drivingly-coupled to said gimbal member and a fixed second electrical resolver drivingly-coupled to said gimbal bracket.

12. The position-sensing and indicating device of claim 11, and wherein the means simultaneously indicating the responses of said range-sensing means, said first-named angle-sensing means and said second angle-sensing means comprise computing circuit means interconnecting the transducers and resolvers, said angular resolvers having respective sine and cosine-deriving portions, said computing circuit means including means to combine the outputs of said portions with the output of the range transducer.

13. The position-sensing and indicating device of claim 12, and wherein the means to combine the outputs of said portions with the output of the range transducer comprises respectively means to combine the outputs of the sine portions of the angular resolvers with the output of the range transducer, whereby to derive a Y-coordinate signal, means to combine the output of the cosine portion of the first angular resolver and the output of the sine portion of the second angular resolver with the output of the range transducer, whereby to derive an X-coordinate signal, and means to combine the output of the cosine portion of the second angular resolver with the output of the range transducer, whereby to derive a Z-coordinate signal.

References Cited
UNITED STATES PATENTS

| | | | |
|---|---|---|---|
| 2,563,599 | 8/1951 | Gardner | 33—174(N) |
| 2,632,952 | 3/1953 | Mallow | 33—1(L.E.) |
| 2,650,046 | 8/1953 | Vanderlip | 33—1(L.E.) |
| 2,885,787 | 5/1959 | Gray et al. | 33—141(B) |
| 3,259,989 | 7/1966 | Wilson | 33—174(L) |
| 2,607,990 | 8/1952 | Payamps | 33—27(C) |

SAMUEL S. MATTHEWS, Primary Examiner